(No Model.)
P. C. MARSH.
HOLDBACK FOR VEHICLES.
No. 366,852. Patented July 19, 1887.
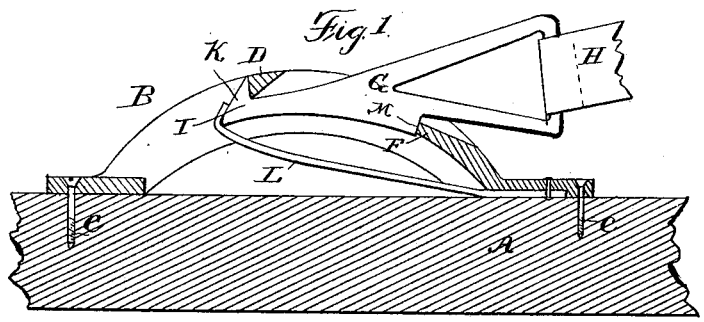
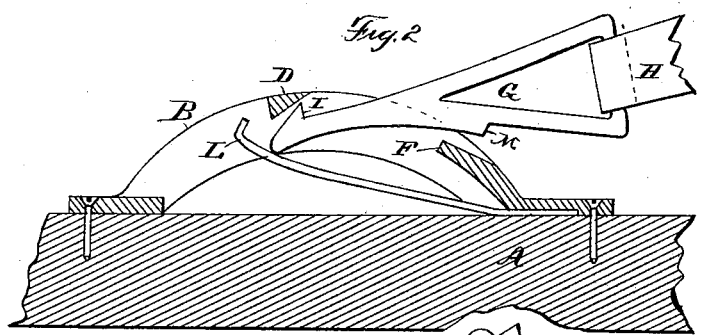
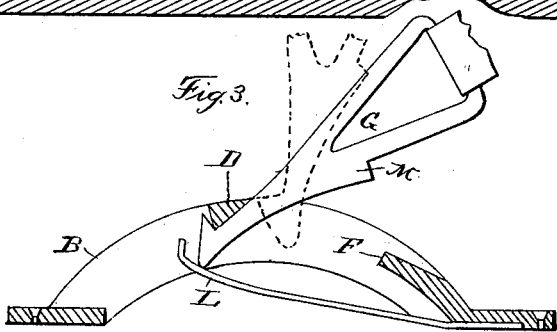
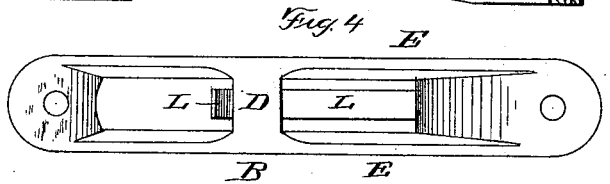
Witnesses
C. W. H. Brown
Frank Brawner
Inventor
P. C. Marsh
By his Attorney
W. A. Bartlett

UNITED STATES PATENT OFFICE.

PARKER C. MARSH, OF TROY, ASSIGNOR OF ONE-HALF TO GEORGE L. STORER, OF ROSSVILLE, NEW YORK.

HOLDBACK FOR VEHICLES.

SPECIFICATION forming part of Letters Patent No. 366,852, dated July 19, 1887.

Application filed December 6, 1886. Serial No. 220,820. (No model.)

*To all whom it may concern:*

Be it known that I, PARKER C. MARSH, residing at Troy, in the county of Rensselaer and State of New York, have invented certain new and useful Improvements in Holdbacks for Vehicles, of which the following is a specification, reference being had therein to the accompanying drawings.

This invention relates to holdbacks for vehicles; and it consists in a catch to be attached to the shafts or pole of a vehicle and a hook connected to the harness-strap, both being of the construction hereinafter described.

Figure 1 is a longitudinal section of the catch attached to the shaft (which is shown as partly broken away) and the hook in its holding position. Fig. 2 is a similar section, the hook in position to engage the catch by a slight forward movement. Fig. 3 is a section showing manner of disengaging the hook from the catch as the animal moves forward. Fig. 4 is a plan of the catch.

A indicates a portion of the shaft of a vehicle, to the upper surface of which the catch B is secured by screws C or equivalent fastening devices.

The catch B, preferably in a single piece of malleable cast-iron or other metal, has two side bars, E E, and a central cross-bar, D, the latter being nearly triangular in cross-section. There is a further cross-bar at each end of the catch. Through these end bars the securing devices G G pass. The rear cross-bar has an abutment, F, for a purpose hereinafter explained.

The hook G has a loop for the attachment of strap H, which is the holdback-strap of the harness. A barb, I, projecting from one side of the body of the hook, engages the cross-bar D, the tapering portion K of the hook forward of the barb sliding under the inclined face of said cross-bar until the barb has passed. The spring L, attached to the lower part of the catch-piece, brings barb I closely into engagement with the cross-bar when in hooked position.

The rear portion of the body of hook G has a side projection, M, which, when the hook is adjusted in its catch, bears against the abutment F of the catch, as shown in Fig. 1 of the drawings. The spring L, pressing on the extreme front end of the hook, as in Fig. 1, throws down the rear portion to hold the projection M to a firm bearing against the abutment F, the cross-bar D serving as a fulcrum.

The hook may be engaged by pressing forward from the position shown in Fig. 2 in cases where the strap is too short to admit of engagement by turning the hook around the cross-bar, as from the position shown in dotted lines, Fig. 2, to that shown in full lines in the same figure.

If the attachment of the horse to the vehicle breaks or is detached when the holdback is hooked, the hook is moved by the forward movement of the animal from the position in Fig. 1 to that shown in dotted lines in Fig. 3, when the hook will become disengaged from its catch. The spring L should be strong enough to hold the hook in the position shown in Fig. 1 until it is drawn with some force into the dotted position, Fig. 3.

I am aware that there are several holdbacks which uncouple automatically when the horse runs away. Such I do not claim, broadly.

I claim—

A holdback for vehicles, consisting of a catch, B, composed of two side bars, cross-pieces connecting the ends of the bars and a cross-piece intermediate the same, a spring under the intermediate cross-bar and a hook having a barb at one side and an incline, K, beyond the barb, and a shoulder in position to engage one of the end cross-pieces when the barb of the hook is in engagement with the intermediate bar, all in combination, substantially as described.

In testimony whereof I affix my signature in presence of two witnesses.

PARKER C. MARSH.

Witnesses:
GEO. L. STORER,
ABRAM L. STOCKWELL.